(12) United States Patent
Tsiava et al.

(10) Patent No.: US 12,703,652 B2
(45) Date of Patent: Aug. 11, 2026

(54) FURNACE OPERATION METHOD

(71) Applicants: L'Air Liquide, Société Anonyme pour l'Etude et l'Exploitation des Procédés Georges Claude, Paris (FR); American Air Liquide, Inc., Fremont, CA (US)

(72) Inventors: Remi Tsiava, Saint Germain-les-Corbeil (FR); Bhupesh Dhungel, Middletown, DE (US)

(73) Assignees: L'Air Liquide, Societe Anonyme Pour l'Etude et l'Exploitation, Des Procedes Georges Claude Paris (FR); American Air Liquide, Inc., Fremont, CA (US)

( * ) Notice: Subject to any disclaimer, the term of this patent is extended or adjusted under 35 U.S.C. 154(b) by 380 days.

(21) Appl. No.: 18/224,380

(22) Filed: Jul. 20, 2023

(65) Prior Publication Data

US 2024/0025787 A1 Jan. 25, 2024

(30) Foreign Application Priority Data

Jul. 21, 2022 (EP) .................................... 22186299

(51) Int. Cl.
*C03B 5/237* (2006.01)
*B01D 53/56* (2006.01)
(Continued)

(52) U.S. Cl.
CPC .............. *C03B 5/237* (2013.01); *B01D 53/56* (2013.01); *B01D 53/79* (2013.01); *C01B 3/047* (2013.01);
(Continued)

(58) Field of Classification Search
CPC ............................... B01D 53/56; B01D 53/79; B01D 2251/2062; B01D 2257/404; C01B 3/047;
(Continued)

(56) References Cited

U.S. PATENT DOCUMENTS

2014/0105816 A1* 4/2014 Grannell .................. C01B 3/06 422/198
2019/0023599 A1* 1/2019 Jarry ....................... C03B 37/14
(Continued)

FOREIGN PATENT DOCUMENTS

WO WO 2013 119281 8/2013
WO WO 2017 160154 9/2017

OTHER PUBLICATIONS

European Search Report for corresponding EP 22186299, Jan. 13, 2023.

*Primary Examiner* — Steven B Mcallister
*Assistant Examiner* — Benjamin W Johnson
(74) *Attorney, Agent, or Firm* — Allen E. White; Elwood L. Haynes

(57) ABSTRACT

A method for operating a furnace, the method including the steps of: combusting fuel with oxidant, thereby generating thermal energy and fumes, heating the furnace with a first part of the thermal energy generated in step a, evacuating the generated fumes from the furnace at a temperature of at least 900° C., the evacuated fumes containing a second part of the thermal energy generated in step a, and using the second part of the thermal energy generated in step a for heating the oxidant and as a heat source for cracking ammonia in a cracker into a mixture including hydrogen, nitrogen and un-cracked ammonia, at least part of the mixture produced in step d-ii being combusted as fuel in step a with at least part of the heated oxidant produced in step d-i.

13 Claims, 2 Drawing Sheets

Scheme 1

(51) Int. Cl.

| | |
|---|---|
| ***B01D 53/79*** | (2006.01) |
| ***C01B 3/047*** | (2026.01) |
| ***C03B 5/225*** | (2006.01) |
| ***F23J 15/04*** | (2006.01) |
| ***F23L 15/04*** | (2006.01) |
| ***F27D 17/10*** | (2025.01) |
| *F23J 15/06* | (2006.01) |
| *F27D 17/00* | (2006.01) |

(52) U.S. Cl.

CPC ............... *C03B 5/225* (2013.01); *F23J 15/04* (2013.01); *F23L 15/045* (2013.01); *F27D 17/10* (2025.01); *B01D 2251/2062* (2013.01); *B01D 2257/404* (2013.01); *C01B 2203/0272* (2013.01); *C01B 2203/0277* (2013.01); *C01B 2203/0811* (2013.01); *C01B 2203/0827* (2013.01); *C01B 2203/0833* (2013.01); *C01B 2203/1064* (2013.01); *F23C 2900/9901* (2013.01); *F23G 2900/50201* (2013.01); *F23G 2900/50202* (2013.01); *F23J 15/06* (2013.01); *F23J 2215/50* (2013.01); *F27D 17/00* (2013.01)

(58) Field of Classification Search

CPC .... C01B 2203/0272; C01B 2203/0277; C01B 2203/0811; C01B 2203/0827; C01B 2203/0833; C01B 2203/1064; C03B 5/225; C03B 5/237; F23C 2900/9901; F23C 2900/50201; F23C 2900/50202; F23J 15/04; F23J 15/06; F23J 2215/50; F23J 2215/045; F27D 17/00; F27D 17/10

USPC .......................................................... 431/11

See application file for complete search history.

(56) References Cited

U.S. PATENT DOCUMENTS

| | | | | |
|---|---|---|---|---|
| 2019/0331423 | A1* | 10/2019 | Jarry | F27B 3/263 |
| 2022/0195919 | A1* | 6/2022 | Akbari | C01B 3/047 |
| 2022/0348459 | A1* | 11/2022 | Northrop | B01J 8/0285 |
| 2023/0053230 | A1* | 2/2023 | Jo | B01J 37/08 |

* cited by examiner

Scheme 1

FURNACE OPERATION METHOD

CROSS REFERENCE TO RELATED APPLICATIONS

This application claims the benefit of priority under 35 U.S.C. § 119 (a) and (b) to European Patent Application No. 22186299.8, filed Jul. 21, 2022, the entire contents of which are incorporated herein by reference.

BACKGROUND

Hydrogen ($H_2$) is a very useful and interesting molecule for a range of applications, such as use as a chemical reactant, as fuel for energy production, etc.

Hydrogen atoms (H) are abundant on earth but generally in the form of molecules in which said hydrogen atoms are chemically bound to other (i.e. non-hydrogen) atoms. This is for example the case in water, but also in hydrocarbons, ammonia and biomass.

In practice, hydrogen ($H_2$) is produced by various processes whereby the hydrogen atoms are separated from the non-hydrogen atoms to which they are connected.

With climate change due to greenhouse gas emission in the atmosphere, the trend is towards lower and preferably and ultimately zero GHG (GreenHouse Gas) emission.

Most Industrial combustion installations, such as glass melting furnaces, currently burn $CH_4$, or other hydrocarbons, for heat generation.

The combustion of methane produces one molecule of $CO_2$ per molecule of methane.

For other hydrocarbons, including biomass hydrocarbons, the number of $CO_2$ molecules which are generated per molecule of hydrocarbon burnt depend on the chemical formula of the hydrocarbon.

Conventionally, said $CO_2$ is released into the atmosphere. To avoid emitting this $CO_2$ into the atmosphere, processes for capturing and storing or using the generated $CO_2$ have been developed. However, these $CO_2$-capturing processes are complex and expensive.

They are currently not cost-effective for processes and installations generating relatively small amounts of $CO_2$, even though the desirability to reduce or avoid $CO_2$-emissions into the atmosphere also exists for industrial installations/processes generating relatively small amounts of $CO_2$.

It would thus be desirable to avoid generating these $CO_2$ emissions by using a carbon-free molecule as fuel. An example of such a carbon-free combustible molecule is ammonia ($NH_3$).

Although the flammability limit of $NH_3$ is close to that of methane, the laminar flame speed obtained with ammonia is about 5 times slower compared to that obtained with methane. This increases the risks of flame lift off (and incomplete combustion), especially when a conventional burner designed for $CH_4$ and similar gaseous hydrocarbon fuels is used for the combustion of ammonia.

It is an aim of the present invention to overcome this problem and to enable a stable flame to be produced starting from ammonia.

SUMMARY OF THE INVENTION

The present invention relates to a method for operating a furnace generating fumes at a temperature of at least 900° C.

According to said method, fuel is combusted with oxidant, said combustion generating thermal energy and fumes, and the furnace is heated with a first part of the thus generated thermal energy.

The generated fumes are evacuated from the furnace at a temperature of at least 900° C. (as indicated earlier), preferably at a temperature between 1250° C. and 1650° C. The evacuated fumes contain a second part of the generated thermal energy, said second part being often referred to as "residual" or "rest" heat.

This second part of the thermal energy generated by combustion is used both (i) for heating the oxidant before the oxidant is used to combust the fuel in step a, and (ii) as a heat source for cracking ammonia in a cracker into a mixture comprising hydrogen, nitrogen and un-cracked ammonia.

During the abovementioned combustion of fuel with oxidant, at least part of the mixture is combusted as fuel with at least part of the heated oxidant.

When the second part of the generated thermal energy is used for heating the oxidant, the oxidant, as the fluid to be heated, is heated by heat exchange with the evacuated fumes, as heat-bearing fluid, i.e. as heat source. Said heat exchange may be direct heat exchange or indirect heat exchange.

During direct heat exchange, the heat-bearing fluid and the fluid to be heated are physically separated from one another by a fluid-impermeable heat-conducting wall across which heat is transferred from the heat-bearing fluid to the fluid to be heated, while mixing between the heat-bearing fluid and the fluid to be heated is prevented.

During indirect heat exchange an intermediate heat-transfer fluid is used. The heat-bearing fluid and the intermediate fluid are physically separated from one another by a first fluid-impermeable heat-conducting wall across which heat is transferred from the heat-bearing fluid to the intermediate fluid, while preventing mixing between the heat-bearing fluid and the intermediate fluid. A heated intermediate fluid is thus obtained and used for heating the fluid to be heated. More specifically, the heated intermediate fluid and the fluid to be heated are separated from one another by a second fluid-impermeable heat-conducting wall across which heat is transferred from the heated intermediate fluid to the fluid to be heated, while preventing mixing between the intermediate fluid and the fluid to be heated. In other words, indirect heat exchange involves (a) direct heat exchange between the heat-bearing fluid and the intermediate fluid and (b) direct heat exchange between the heated intermediate fluid and the fluid to be heated. The two direct heat exchange substeps may be performed in a common heat exchanger or in separate heat exchangers.

Compared to indirect heat exchange, direct heat exchange between the heat-bearing fluid and the fluid to be heated has the advantage to be simpler (no additional fluid required) and to allow a more compact construction (no volume or flow path required for the intermediate fluid).

Compared to direct heat exchange, indirect heat exchange can provide an additional tool for controlling the heat exchange process (in particular when the intermediate fluid is not static, but flowing) and can provide additional security/safety through the selection of a suitable, typically inert, intermediate fluid (in that, in case of leakage of a heat-conducting wall (first or second), the heat-bearing fluid or the fluid to be heated (depending on the leaking wall) may mix with the intermediate fluid, but mixing of the heat-bearing fluid and the fluid to be heated is avoided).

In the present context, the term 'cracker' refers to any device suitable for cracking ammonia into the above-mentioned mixture.

It is, in principle, desirable for the ammonia cracking reaction to be as complete as possible, i.e. to maximize hydrogen generation and to limit the amount of ammonia remaining in the mixture. In practice, however, it will typically prove too costly to seek the complete (100%) cracking of the ammonia and some ammonia will remain in the mixture.

The present invention is particularly useful when the oxidant used for combustion fuel to heat the furnace is an oxygen-rich oxidant, more particularly an oxidant with an oxygen content between more than 21 and 100% vol, preferably between 70 and 100% vol and more preferably between 90 and 100% vol. Indeed, oxygen-rich oxidants generally produce higher-temperature flames and higher-temperature fumes than oxidants which are not oxygen-rich.

The fuel which is combusted may be a combination of the mixture obtained by cracking ammonia (or part thereof) with one or more further fuels. However, the fuel which is combusted to heat the furnace preferably consists of the mixture produced by ammonia cracking or of part of said mixture.

According to the invention, residual heat from the furnace, i.e. the second part of the thermal energy generated by combustion, is not only used for heating the oxidant, but also as a heat source for cracking the ammonia.

As the mixture produced by ammonia cracking contains nitrogen, in the form of $N_2$ and generally also as part of the un-cracked ammonia fraction, the evacuated fumes may contain nitrogen oxides, generally referred to as NOx. Other possible sources of NOx generation are any nitrogen present in the combustion oxidant, nitrogen present in the charge heated in the furnace and nitrogen present in ingress air when the furnace is operated at sub-atmospheric pressure.

Nitrogen oxides are polluting agents of which the release into the atmosphere is highly undesirable. In many countries, industrial combustion processes are subject to norms limiting NOx emissions.

In accordance with the present invention, NOx emissions into the atmosphere may be reduced or eliminated by adding a NOx-reducing agent to the evacuated fumes. Such NOx-reducing agents chemically react with the NOx present in the evacuated fumes. The product of the chemical reaction between the NOx and the NOx-reducing agent is then separated from the evacuated fumes.

NOx-reducing agent may be added to the evacuated fumes before said fumes are being used to heat oxidant and to crack ammonia, after having been used to heat oxidant and to crack ammonia or between their use for heating oxidant and for cracking the ammonia, regardless of the order in which the evacuated fumes are used for these two purposes. NOx-reducing agent may also be added to the evacuated fumes at two or more of the abovementioned stages. One particular NOx-reducing agent which may be used in the method of the present invention is ammonia.

There are several ways in which the residual heat from the furnace may be used as a heat source for ammonia cracking.

One such way is by heating the cracker in which the ammonia cracking takes place with the second part of the generated thermal energy present in the evacuated fumes.

Another possibility, which may or may not be combined with such heating of the cracker, is to use the second part of the generated thermal energy present in the evacuated fumes to heat the ammonia by direct or indirect heat exchange.

According to one embodiment of the present invention, (a) the oxidant is heated by indirect heat exchange with the evacuated fumes while (b) the ammonia is heated by direct heat exchange with the evacuated fumes upstream of and/or in the cracker.

In that case, the evacuated fumes may be divided into multiple portions, a first portion of the evacuated fumes being used to heat the oxidant by indirect heat exchange and a second portion of the evacuated fumes being used to heat the ammonia by direct heat exchange.

It is also possible to heat the oxidant by indirect heat exchange with the evacuated fumes and to heat the ammonia by direct heat exchange with the evacuated fumes previously used in step for heating the oxidant by indirect heat exchange, i.e. for heating by direct heat exchange the intermediate fluid used to heat the oxidant. Alternatively, the oxidant may be heated by indirect heat exchange with the evacuated fumes previously used for heating the ammonia.

Finally, the intermediate fluid and the ammonia can be heated in parallel by direct heat exchange with the evacuated fumes or a same portion of the evacuated fumes when a single heat exchanger is used for that purpose. For example, in a shell-and-tube heat exchanger, evacuated fumes may flow on the shell-side of the heat exchanger, while intermediate fluid for heating the oxidant flows as fluid to be heated in some of the tubes and ammonia flows as fluid to be heated in other tubes of the heat exchanger.

According to an alternative embodiment, the oxidant and the ammonia are both heated by direct heat exchange with the evacuated fumes, the ammonia being heated by direct heat exchange with the evacuated fumes upstream of and/or in the cracker.

It may be advantageous, and in particular more compact, to heat the oxidant and the ammonia by direct heat exchange with the evacuated fumes in a combined heat-exchanger/cracker.

Again, the evacuated fumes may be divided into multiple portions, a first portion of the evacuated fumes being used to heat the oxidant by direct heat exchange and a second portion of the evacuated fumes being used to heat the ammonia by direct heat exchange.

Alternatively, the evacuated fumes which have previously been used to heat oxidant by direct heat exchange can be used to heat the ammonia by direct heat exchange or the evacuated fumes which have previously been used to heat the ammonia by direct heat exchange can be used to heat the oxidant by direct heat exchange.

Again, it is also possible to heat the oxidant and the ammonia in parallel by direct heat exchange with the evacuated fumes or a same portion of the evacuated fumes when a single heat exchanger is used for that purpose, for example, in a shell-and-tube heat exchanger with evacuated fumes flowing on the shell-side of the heat exchanger and oxidant and ammonia flowing as fluid to be heated in different tubes of the heat exchanger.

According to a further possible embodiment, the oxidant and the ammonia are both heated by indirect heat exchange with the evacuated fumes, the ammonia being heated upstream of and/or in the cracker.

Thereto, the evacuated fumes may be divided into multiple portions, a first portion of the evacuated fumes being used to heat the oxidant by indirect heat exchange and a second portion of the evacuated fumes being used to heat the ammonia by indirect heat exchange.

It is also possible to use the evacuated fumes to heat a first intermediate fluid and a second intermediate fluid, whereby the heated first intermediate fluid is used for heating the oxidant and the heated second intermediate fluid is used to heat the ammonia. The first and second intermediate fluid may be heated by different portions of the evacuated fumes, i.e. the first intermediate fluid is heated by a first portion of the evacuated fumes and the second intermediate fluid is heated by a second portion of the evacuated fumes. It is also possible to heat the second intermediate fluid, which is used for heating the ammonia, by direct heat exchange with the evacuated fumes, which have previously been used to heat the first intermediate fluid, which is used for heating the oxidant. Alternatively, the first intermediate fluid, which is used for heating the oxidant, may be heated by direct heat exchange with the evacuated fumes, which have previously been used to heat the second intermediate fluid, which is used for heating the ammonia. The first and second intermediate fluid can also be heated in parallel by direct heat exchange with the evacuated fumes or a same portion of the evacuated fumes in a single heat exchanger.

A further option is to use a same intermediate fluid to heat both the oxidant and the ammonia.

According to one such embodiment, intermediate fluid is heated by direct heat exchange with the evacuated fumes and the heated intermediate fluid thus obtained is divided in multiple portions. A first portion of the thus heated intermediate fluid is used to heat the oxidant and a second portion of the heated intermediate fluid is used to heat the ammonia.

According to a further such embodiment, the heated intermediate fluid is first used to heat the oxidant and the heated intermediate fluid which has previously been used to heat the oxidant is used to heat the ammonia. Alternatively, the heated intermediate fluid may first be used to heat the ammonia and the heated intermediate fluid which has previously been used to heat the ammonia is used to heat the oxidant. The oxidant and ammonia can also be heated in parallel by direct heat exchange with the heated intermediate fluid in a single heat exchanger.

In all of these cases, the heating of the oxidant and the ammonia by heat exchange with intermediate fluid may take place in a combined heat-exchanger/cracker.

The cracker used for cracking the ammonia may be a non-catalytic cracker or a catalytic cracker.

The temperature to which the ammonia is heated depends on the nature of the cracker (in particular catalytic or non-catalytic) and in the case of a catalytic cracker, on the nature of the catalyst. Known examples of suitable ammonia-cracking catalysts include catalysts based on rare metals such as ruthenium and cobalt. In most cases, the temperature to which the ammonia must be heated for effective ammonia cracking will be lower for a catalytic cracker compared to a non-catalytic cracker. For example, with a suitable catalyst, $H_2$ with a purity of approximately 75 vol. % can be produced at a temperature of about 500° C. As shown in FIG. 1, which is an equilibrium graph for $NH_3$ cracking without the use of catalyst, almost 70% purity $H_2$ can be produced by heating the ammonia to 1000° C. without the use of a catalyst.

Due to the high temperature at which the fumes are evacuated from glass furnaces, the method according to the present invention is particularly suited for use with glass furnaces, whereby glass furnaces include in particular glass-melting furnaces, glass-refining furnaces and glass-melting-and-refining furnaces.

The present invention thus enables a stable flame to be obtained when ammonia is supplied as fuel, by cracking the ammonia so as to produce hydrogen and by burning the hydrogen in the furnace. This can be done efficiently in that waste heat from the furnace is used for cracking the ammonia. As said waste heat is also used to preheat the oxidant, preferably oxygen-enriched air or oxygen, before the oxidant is used to burn the hydrogen, the furnace efficiency is further increased.

BRIEF DESCRIPTION OF THE DRAWINGS

For a further understanding of the nature and objects for the present invention, reference should be made to the following detailed description, taken in conjunction with the accompanying drawings, in which like elements are given the same or analogous reference numbers and wherein.

DETAILED DESCRIPTION OF PREFERRED EMBODIMENTS

Figure 1:
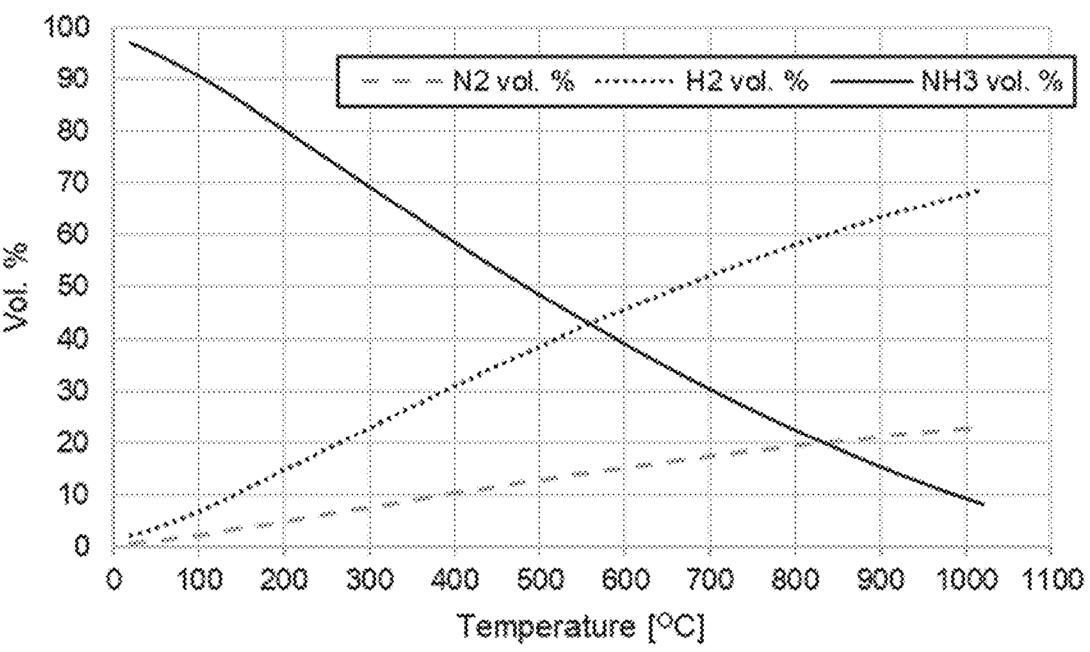
FIG. 1 illustrates an equilibrium graph for $NH_3$ cracking without the use of catalyst.

The combustion gases or fumes 20 are evacuated from furnace 10 at a temperature T20 of about 1350° C.

Ammonia 30 is supplied to cracker 40. Cracker 40 is non-catalytic.

The hot fumes 20 evacuated from furnace 10 are used to raise the temperature of the ammonia 30 in cracker 40 to about 1000° C., temperature at which non-catalytic ammonia cracking takes place, by direct heat exchange between hot fumes 20 and ammonia 30. Cracker 40 thus is a combined cracker/heat exchanger.

At this temperature, the ammonia cracks to produce a gas mixture 50 containing approximately 65 vol. % $H_2$.

Gas mixture 50 is supplied to one or more burners (not shown) of furnace 10 as fuel. By first cracking ammonia 30 and supplying the gas mixture 50 thereby produced as fuel for combustion in furnace 10, a more stable combustion is obtained compared to when ammonia 30 is supplied directly to furnace 10 as fuel. In this manner, the present invention improves the efficiency and reliability of furnace 10.

After having been used to heat ammonia 30 in cracker 40, fumes 60 still contain a high level of residual thermal energy. In the illustrated embodiment, fumes 60 are used to heat oxygen 70, with a purity of at least 95% vol, to a temperature between 550-800° C., for example to 650° C. in heat exchanger 80. Heat exchanger 80 may be a direct or an indirect heat exchanger.

The oxygen 90 thus heated in heat exchanger 80 is also supplied to the burner(s) of furnace 10 as combustion oxidant, thereby further improving the efficiency of furnace 10.

The fumes 100 leaving heat exchanger 80 are still at a sufficiently high temperature to allow $NH_3$ injection into said fumes 100 for NOx reduction. A small amount of $NH_3$ (depending on the level of NOx formed) can thus be injected into fumes 100 downstream of heat exchanger 80 to reduce said NOx.

Figure 2:
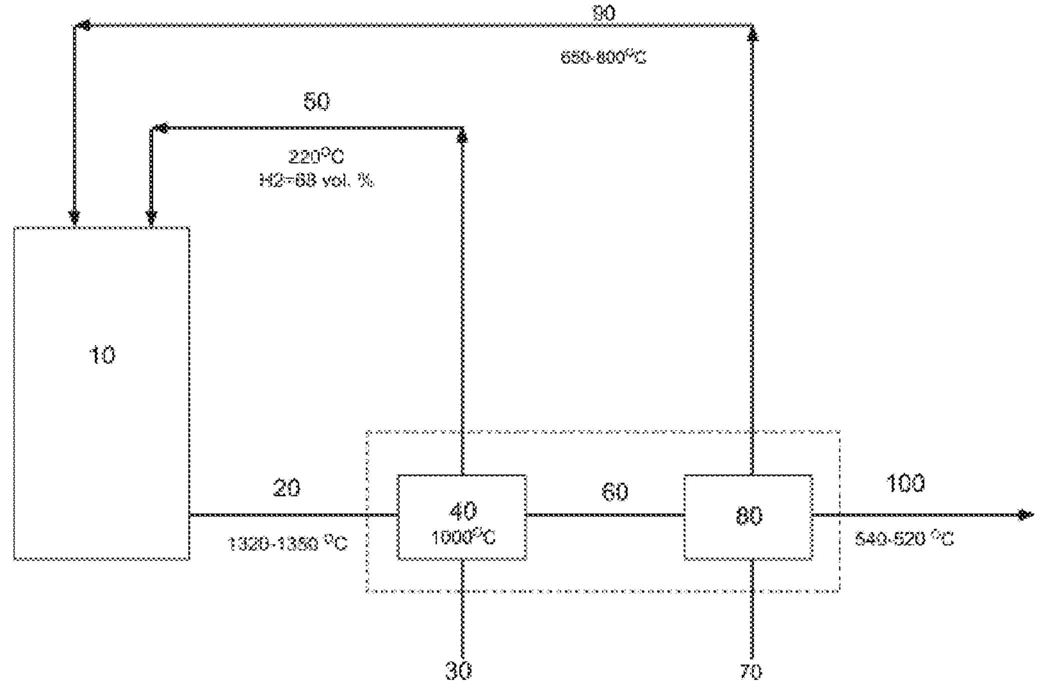
FIG. 2 is a schematic representation of a first embodiment of the method in accordance with the invention, whereby furnace 10 is a glass melting furnace.

Whereas FIG. 2 shows cracker/heat exchanger 40 and oxidant heat exchanger 80 as two distinct devices, it is possible to combine cracker/heat exchanger and oxidant heat exchanger 80 in a single device in which both ammonia 30 and oxygen 70 are heated and the ammonia is cracked.

According to said alternative embodiment, residual thermal energy present in evacuated fumes 20 at about 1350° C. is used to heat air 41, typically ambient air, used as an intermediate fluid for indirect heat exchange to about 550° C. in air heat exchanger 40*a*. The hot air 42 generated in heat exchanger 40*a* is then supplied to cracker 40*b*, for heating ammonia 30 to approximately 500° C. therein. Cracker 40*b* is a catalytic cracker. The catalyst present in cracker 40*b* enables the ammonia to be cracked at 500° C. to produce a gas mixture 50 containing approximately 75 vol. % $H_2$. Gas mixture 50 is sent to the burner(s) of furnace 10 as fuel. After having been used to heat intermediate fluid air 41 in heat exchanger 40*a*, fumes 60 are used to heat oxygen 70 in oxidant heat exchanger 80, in a manner similar to what is illustrated in FIG. 2. The oxygen 90 heated in heat exchanger 80 is again also supplied to the burner(s) of furnace 10 as combustion oxidant.

Figure 3:
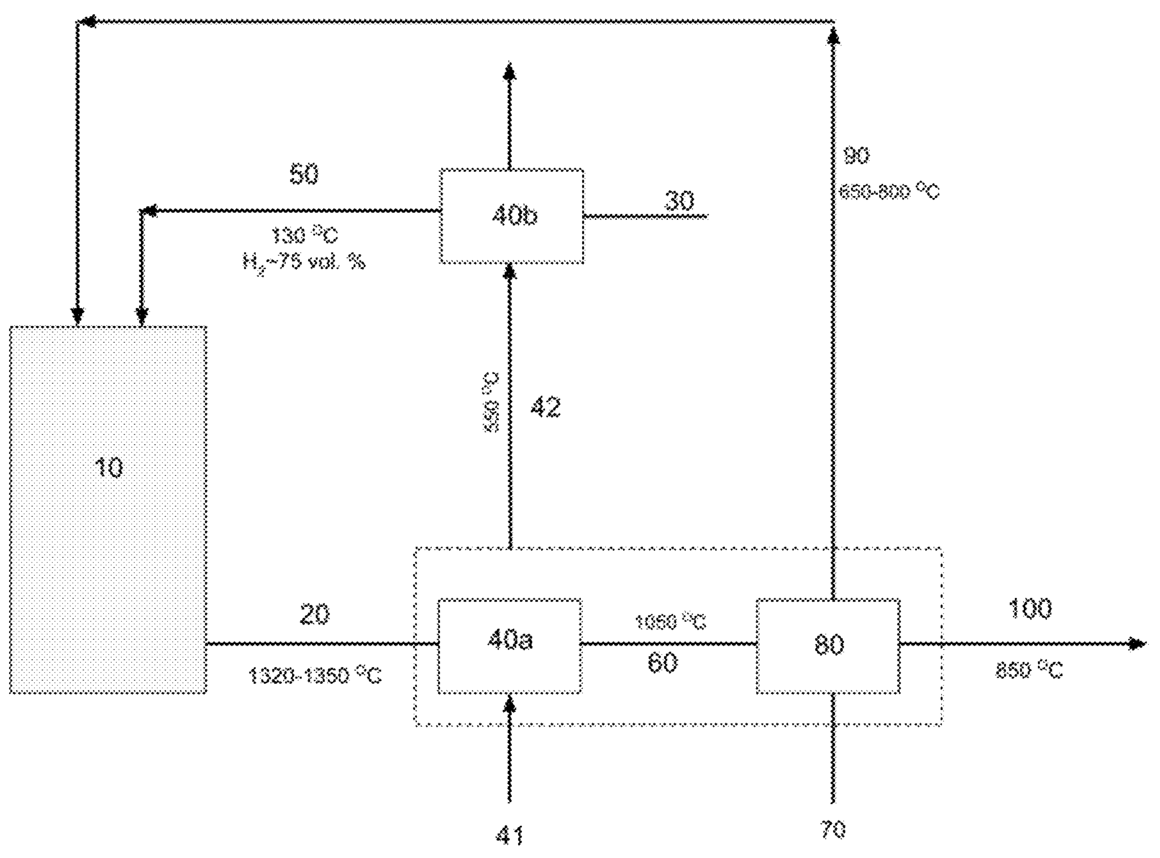
FIG. 3 is a schematic representation of an alternative embodiment of the method according to the present invention.

Ammonia may be injected (not shown) into fumes 100 leaving oxidant heat exchanger 80 by way of NOx-reducing agent. The main advantage of embodiments, such as the one illustrated in FIG. 3, whereby a catalytic cracker 40*a* is used, is that ammonia 30 need not be heated to the high temperature required for non-catalytic ammonia cracking as illustrated in FIG. 2.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A method for operating a furnace, comprising:

a. combusting fuel with oxidant, thereby generating thermal energy and fumes, b. heating the furnace with a first part of the thermal energy generated in step a, c. evacuating the generated fumes from the furnace at a temperature of at least 900° C., the evacuated fumes containing a second part of the thermal energy generated in step a, d. using the second part of the thermal energy generated in step a:

i. for heating the oxidant, as fluid to be heated, by direct or indirect heat exchange with the evacuated fumes, as heat-bearing fluid, before the heated oxidant is used to combust the fuel in step a, and ii. as a heat source for cracking ammonia in a cracker into a mixture comprising hydrogen, nitrogen and un-cracked ammonia, wherein the ammonia is cracked without the use of catalyst, and wherein the ammonia is heated to a temperature of 1000° C.;

whereby:

during direct heat exchange, the heat-bearing fluid and fluid to be heated are physically separated from one another by a fluid-impermeable heat-conducting wall across which heat is transferred from the heat-bearing fluid to the fluid to be heated, while preventing mixing between the heat-bearing fluid and the fluid to be heated; and during indirect heat exchange:

an intermediate heat-transfer fluid is used, the heat-bearing fluid and the intermediate fluid are physically separated from one another by a first fluid-impermeable heat-conducting wall across which heat is transferred from the heat-bearing fluid to the intermediate fluid, while preventing mixing between the heat-bearing fluid and the intermediate fluid, so as to obtain a heated intermediate fluid, and the heated intermediate fluid and the fluid to be heated are separated from one another by a second fluid-impermeable heat-conducting wall across which heat is transferred from the intermediate fluid to the fluid to be heated, while preventing mixing between the heated intermediate fluid and the fluid to be heated; and whereby, in step a, at least part of the mixture produced in step d-ii is combusted as fuel in step a with at least part of the heated oxidant produced in step d-i.

2. The method according to claim 1, whereby a NOx-reducing agent is added to the evacuated fumes before step d and/or after step d and/or between step d-i and d-ii.

3. The method according to claim 2, whereby ammonia is used as NOx reducing agent.

4. The method according to claim 1, whereby, in step d-i, the oxidant is heated by indirect heat exchange with the evacuated fumes and whereby, in step d-ii, the ammonia is heated by direct heat exchange with the evacuated fumes upstream of and/or in the cracker.

5. The method according to claim 4:

a. whereby a first portion of the evacuated fumes is used to heat the oxidant in step d-i and a second portion of the evacuated fumes is used to heat the ammonia in step d-ii, or b. whereby, in step d-ii, the ammonia is heated by direct heat exchange with the evacuated fumes previously used in step d-i for heating the oxidant, or c. whereby, in step d-i, the oxidant is heated by indirect heat exchange with the evacuated fumes previously used in step d-ii for heating the ammonia.

6. The method according to claim 1, whereby the oxidant and the ammonia are heated by direct heat exchange with the evacuated fumes in steps d-i, respectively d-ii.

7. The method according to claim 6:

a. whereby, a first portion of the evacuated fumes is used to heat the oxidant in step d-i and a second portion of the evacuated fumes is used to heat the ammonia in step d-ii, or b. whereby, in step d-ii, the ammonia is heated by direct heat exchange with the evacuated fumes previously used in step d-i for heating the oxidant, or c. whereby, in step d-i, the oxidant is heated by direct heat exchange with the evacuated fumes previously used in step d-ii for heating the ammonia.

8. The method according to claim 1, whereby the oxidant and the ammonia are heated by indirect heat exchange with the evacuated fumes in steps d-i, d-ii respectively.

9. The method according to claim 8:

a. whereby, a first portion of the evacuated fumes is used to heat the oxidant in step d-i and a second portion of the evacuated fumes is used to heat the ammonia in step d-ii, or b. whereby, in step d, the second part of the thermal energy generated in step a is used to heat a first and a second intermediate fluid, the first intermediate fluid is used for heating the oxidant in step d-i and the second intermediate fluid is used in step d-ii for heating the ammonia upstream of and/or in the cracker, or c. whereby the evacuated fumes are used to heat an intermediate fluid and whereby the heated intermediate fluid is used for heating the oxidant in step d-i and for heating the ammonia upstream of and/or in the cracker.

10. The method according to claim 9, whereby, in step d, the second part of the thermal energy generated in step a is used to heat a first and a second intermediate fluid, the first intermediate fluid is used for heating the oxidant in step d-i and the second intermediate fluid is used in step d-ii for heating the ammonia upstream of and/or in the cracker and:

a. whereby the second intermediate fluid is heated by heat exchange with the evacuated fumes previously used for heating the first intermediate fluid, or b. whereby the first intermediate fluid is heated by heat exchange with the evacuated fumes previously used for heating the second intermediate fluid.

11. The method according to claim 9, whereby the evacuated fumes are used to heat an intermediate fluid and whereby the heated intermediate fluid is used for heating the oxidant in step d-i and for heating the ammonia upstream of and/or in the cracker and a. whereby a first portion of the heated intermediate fluid is used for heating the oxidant in step d-i and whereby a second portion of the intermediate fluid is used in step d-ii for heating the ammonia upstream of and/or in the cracker, or b. whereby, in step d-ii, the ammonia is heated by direct heat exchange with the heated intermediate fluid previously used in step d-i for heating the oxidant, or c. whereby, in step d-i, the oxidant is heated by direct heat exchange with the heated intermediate fluid previously used in step d-ii for heating the ammonia.

12. The method according to claim 1, whereby the oxidant and the ammonia are heated respectively in step d-i and step d-ii in a combined heat-exchanger/cracker.

13. The method according to claim 1, whereby the furnace is a glass furnace selected from the group consisting of glass-melting furnaces, glass-refining furnaces and glass-melting-and-refining furnaces.

* * * * *